United States Patent [19]

Fujii et al.

[11] 3,909,618

[45] Sept. 30, 1975

[54] CARRIER TRANSMISSION SYSTEM UTILIZING COMMERCIAL POWER LINES AS TRANSMISSION LINES

[75] Inventors: Masaru Fujii; Tatsuhiro Yasunaga, both of Hiroshima, Japan

[73] Assignee: Sharp Kabushiki Kaisha, Osaka, Japan

[22] Filed: Jan. 18, 1974

[21] Appl. No.: 434,832

[30] Foreign Application Priority Data

Oct. 23, 1973 Japan ............................ 48-119163

Jan. 19, 1973 Japan ................................ 48-9643

[52] U.S. Cl. ................................ 307/3; 179/2.5 R

[51] Int. Cl.[2] ........................................ H02J 3/34

[58] Field of Search .. 307/3, 27; 340/310 R, 310 A; 179/2.5 R, 2.5 A

[56] References Cited

UNITED STATES PATENTS

| | | | |
|---|---|---|---|
| 3,369,078 | 2/1968 | Stradley | 307/3 X |
| 3,397,360 | 8/1968 | Kaneko et al. | 325/45 |
| 3,400,221 | 9/1968 | Wolters | 179/2.5 R |
| 3,418,578 | 12/1968 | Bose | 325/45 |

*Primary Examiner*—Robert K. Schaffer

*Assistant Examiner*—M. Ginsburg

*Attorney, Agent, or Firm*—Stewart and Kolasch, Ltd.

[57] ABSTRACT

A transmitter circuit and a receiver circuit couplied to such other via commericial A.C. power lines both include a phase locked loop (PLL) arrangement. In the PLL arrangement associated with the transmitter circuit, sound signals are applied to a voltage-controlled oscillator included therein to produce frequency-modulated carrier signals, which in turn are transmitted to the A.C. power lines. On the other hand, the PLL arrangement within the receiver accepts the frequency-modulated carrier signals transmitted via the A.C. power lines. Demodulation of the frequency-modulated carrier signals is provided by such PLL arrangement.

7 Claims, 4 Drawing Figures

CARRIER TRANSMISSION SYSTEM UTILIZING COMMERCIAL POWER LINES AS TRANSMISSION LINES

BACKGROUND OF THE INVENTION

This invention relates to a carrier transmission system utilizing commercial A.C. power lines as the transmission lines therefor.

In conventional design, this type of carrier transmission system is constructed and arranged on the basis of an AM system. In such AM systems, however, utilization as the transmission lines thereof of commercial A.C. power lines the latter having the characteristics of containing noises of comparatively high level, results in deterioration in the tone quality or high fidelity characteristic. In contrast to AM systems, an FM system can provide good signal-to-noise ratio and thus improve tone quality.

In applying the commercial A.C. lines to the transmission lines, the carrier frequency should be limited to a comparatively low frequency range, for example, 50KHz–500 KHz due to the frequency response of the power lines and so forth. Within the conventional FM system, the modulator circuit and demodulator circuit are composed of a coil and a capacitor and such implementation itself is complex and expensive because the carrier frequency is considerably low. That is, in the FM modulator circuit the circuit construction is complex, and the operation thereof is unstable if the maximum of frequency deviation is chosen larger, due to the requirements that the carrier frequency should be low. Also if the carrier frequency and maximum frequency deviation are chosen low and large respectively in the FM demodulator circuit, the values of inductance and capacitance should be larger and accordingly it is difficult to obtain effective and stable performances. For these reasons, the FM system is applicable to only special purposes. However, effort is being expended by industry to develop a carrier transmission system which may be implemented on the basis of the FM system at low cost and with simple circuit construction.

OBJECTS AND SUMMARY OF THE INVENTION

Accordingly, it is an object of this invention to provide a carrier transmission system utilizing commercial A.C. power lines as transmission lines.

It is another object of this invention to provide a carrier transmission system based upon a FM system.

It is still another object of this invention to provide a carrier transmission system which may be implemented with a stable and inexpensive circuit construction.

In recent years, with the development of integrated circuit technique, a phase locked loop (PLL) arrangement incorporated into a single integrated circuit has become commercially available. The PLL arrangement is useful to simplify the FM modulator circuit and FM demodulator circuit. The PLL-IC developed by the inventors provides stable operations even at a comparatively low frequency of carrier signals.

The above and other objects and novel features of the invention are set forth in the appended claims and the invention as to its organization and its mode of operation will best be understood from a consideration of the following detailed description of the proferred embodiments.

DESCRIPTION OF THE PREFERRED EMBODIMENTS

Figure 1:
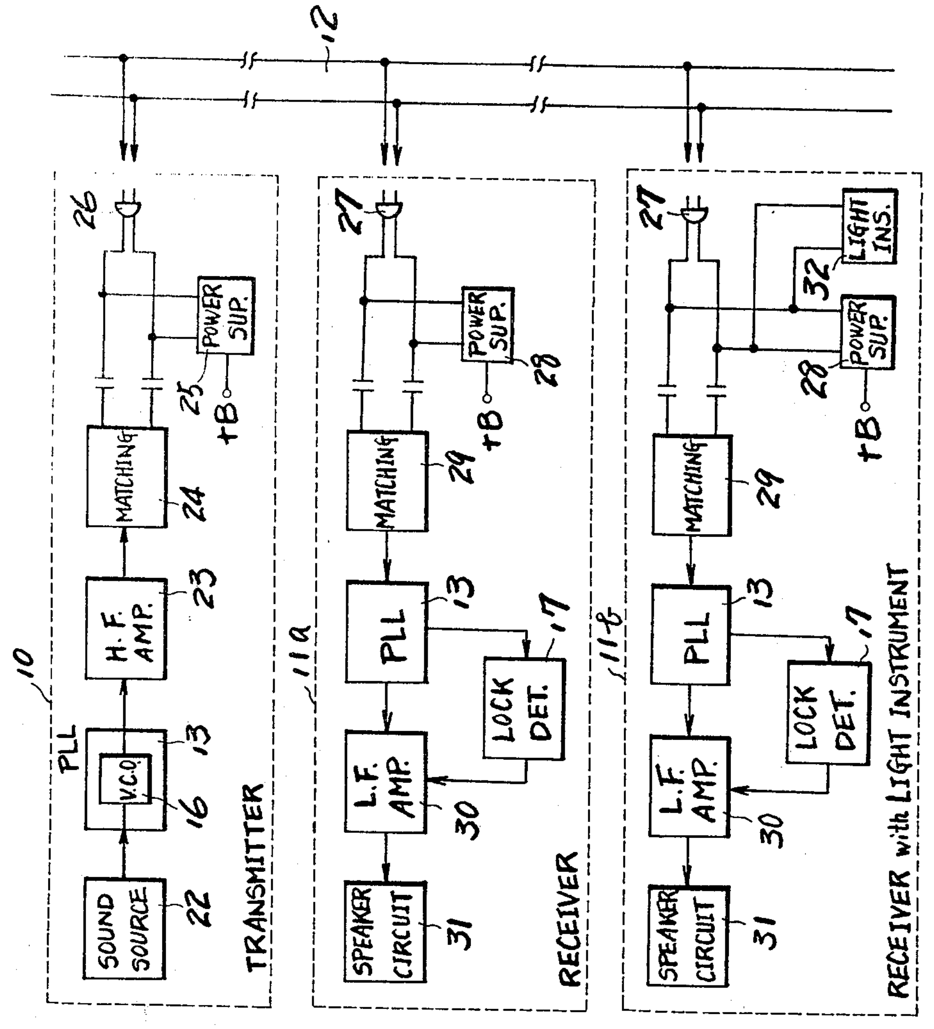
FIG. 1 is a block diagram showing one embodiment of a carrier transmission system of this invention.
Figure 2:
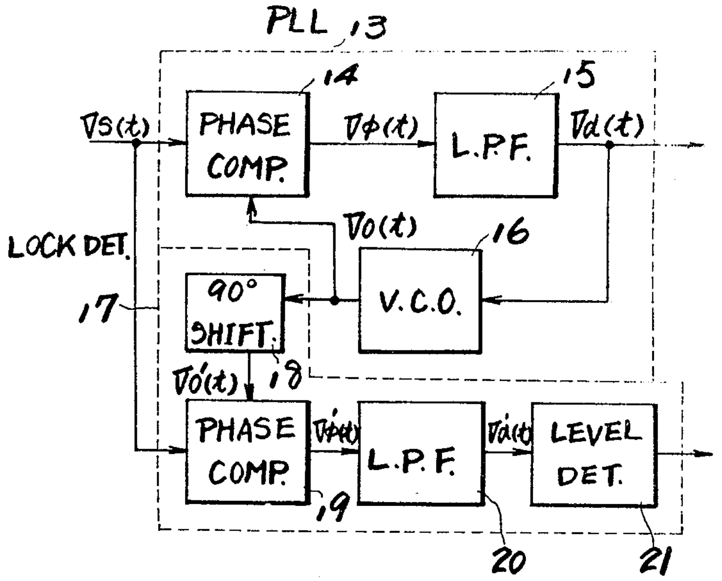
FIG. 2 is a block diagram showing a lock detector associated with a PLL arrangement employed in the embodiment of FIG. 1.

Referring now to FIG. 1, there is illustrated a carrier transmission system which comprises a transmitter circuit 10 and two receiver circuits 11*a*, 11*b* connected to the transmitter circuit 10 via commercial A.C. power lines 12, for example. The transmitter and receiver circuits 10, 11*a*, 11*b* each include a phase locked loop arrangement 13 which is illustrated in FIG. 2.

As is well known in the art, the PLL arrangement 13 comprises a loop including a phase comparator 14, a low-pass filter 15, and a voltage-controlled oscillator 16. A portion of the input to the phase comparator 14 and a portion of the output from the voltage-controlled oscillator 16 are respectively applied to a 90° phase shifter 18 and a phase comparator 19 within a lock detector 17. The phase comparator 19 receives as another input thereto the output from the 90° phase shifter 18, the output thereof being applied to a level detector 21 via a low-pass filter 20. The PLL arrangement 13 and lock detector 17 together may be incorporated into a single integrated circuit.

The following are modes of operation of the PLL arrangement 13 described above. The phase comparator 14 serves to compare phase of the input signals Vs($t$) with that of the output signals Vo($t$) of the voltage-controlled oscillator 16 and produce the output signals V$\phi$ ($t$) indicative of a sum of the added component and subtracted component with respect to the individual frequencies of the two signals thereto. The low-pass filter 15 extracts from the individual frequency components of the output signals V$\phi$ ($t$) the subtract component or the frequency difference component Vd($t$) necessary for control. At this time the voltage-controlled oscillator 16 oscillates at the frequency corresponding to the control signal Vd($t$) and, when no control signal Vd($t$) develops, oscillates at the free-running frequency fo determined by the circuit constant of the voltage-controlled oscillator 16. In the case where the circuit is constructed in a closed loop and the input signals Vs($t$) are frequency-modulated signals having changes in phase with respect to time, the control signals Vd($t$) equal frequency-demodulated outputs. Conversely, when no input signals Vs($t$) exist and the sound signals are applied to the oscillator 16 instead of the control signals, the voltage-controlled oscillator 16 provides frequency-modulated signals the frequency of which modifies about the free-running frequency fo in accordance with the sound signals applied thereto.

By virtue of the operations of the PLL arrangement 13 the voltage-controlled oscillator 16 is locked in the condition where it oscillates with following the input signals Vs($t$). In the lock detector 17, a portion of the output signals Vo($t$) from the voltage-controlled oscillator 16 is applied to the 90° phase shifter 18, the outputs Vo'($t$) of which in turn are applied to the phase comparator 19. The phase comparator 19 also receives the input signals Vs($t$) which are applied to the phase comparator 14 within the PLL arrangement 13. As a result, the phase comparator 19 compares these phases and then produces the output signals V$\phi$'($t$) indicative of a sum of the frequency-added component and frequency-subtracted component with respect to the two signals applied thereto, in the same manner as the phase comparator 14 within the PLL arrangement 13. The low-pass filter 20 permits only the difference component to pass therethrough. The output signals Vd'($t$) of the low-pass filter 20 will exceed a predetermined level when the PLL arrangement 13 is in the locked condition, and the level detector 21 determines whether the PLL arrangement 13 is in the locked condition by sensing the voltage level of the output signals Vd'($t$).

Returning back to FIG. 1, the transmitter circuit 10 contains a source 22 of sound signals, for example, such as tape decks, tape players, and radio receivers, the above described PLL arrangement 13, a high frequency amplifier 23, a matching circuit 24, a power circuit 25, a plug 26 and so forth, while the receiver circuits 11*a*, 11*b* each contain a plug 27, a power circuit 28, a matching circuit 29, the above described PLL arrangement 13, lock detector 17, a low frequency amplifier 30, a speaker circuit 31 and so forth.

The PLL arrangement 13 within the transmitter circuit 10 connects the sound signals from the sound source 22 to the voltage-controlled oscillator 16 therein instead of the control signals Vd($t$) so that the oscillation signals are frequency-modulated about the free-running frequency fo.

Meanwhile, in the PLL arrangement 13 within the receiver circuits 11*a*, 11*b*, the frequency-modulated carrier signals are imposed as the input signals Vs($t$) on the phase comparator 14 shown in FIG. 2 and then the frequency-demodulated outputs develop from the control signals Vd($t$) for the voltage-controlled oscillator 16. As explained previously the lock detector 17 associated with the PLL arrangement 13 determines whether the PLL arrangement 13 is in the locked condition and, if affirmative the low frequency amplifier 30 is turned to the amplifying operation state. Otherwise, the low frequency amplifier 30 is in the cut-off state. The power circuits 25, 28 rectify and smooth a commercial A.C. power voltage and supply a D.C. voltage +B to the individual circuit components within the transmitter and receiver circuits 10, 11*a*, 11*b*. The PLL arrangement 13 and lock detector 17 may be incorporated into a single integrated circuit device.

Now assume that the plugs 26, 27 of the transmitter and receiver circuits 10, 11*a* are connected to the commercial A.C. power lines 12. Thus, both circuits are electrically connected together and the A.C. power is supplied to the individual power circuits 25, 28.

In the transmitter circuit 10, when the sound signals from the sound source 22 are applied to the voltage-controlled oscillator 16 deposited within the PLL arrangement 13, there are provided at the output of the voltage-controlled oscillator 16 FM carrier signals the frequency of which is modulated in accordance with the sound signals. The FM carrier signals are power-amplified by the high frequency amplifier 23 and fed to the commercial A.C. lines 12 through the matching circuit 24 and plug 26.

The frequency-modulated carrier signals transmitted via the A.C. power lines or transmission lines 12 arrive at the PLL arrangement 13 within the receiver circuit 11*a* through the plug 27 and matching circuit 29. Upon receipt of the FM modulation carrier signals the PLL arrangement 13 within the receiver circuit 11*a* is in the locked condition to provide the FM demodulator outputs. At this time the low frequency amplifier 30 is in the amplifying operation state and power amplification is thus provided for the FM demodulator outputs thereby activating the speaker circuit 31.

In the illustrated embodiment of the invention, the free-running frequency fo of the voltage-controlled oscillator 16 within the transmitter 10 may be optionally adjusted by changing the capacitance and resistance in the voltage controlled-oscillator 16, even if the free-running frequency fo is a comparatively low frequency. Furthermore, the oscillation is still stable provided that the maximum of frequency deviation is in a range of ±5%. For these reasons, the frequency-modulated carrier signals are obtainable with low cost and simple circuit in the transmitter circuit 10 by utilizing such PLL arrangement 13. In the receiver site, the lockable range of the PLL arrangement 13 may be extended to about 10–20% of the free-running frequency fo and therefore the oscillation is completely stabilized if the maximum of frequency deviation will increase to ±5%. In other words, the frequency-modulated carrier signals of which the carrier frequency is low and the frequency deviation is large, may be demodulated in the receiver circuit 11*a*. The PLL arrangement 13 follows the frequency of the input signals Vs($t$) within the lockable range. As a consequence if the free-running frequency fo in the transmitter circuit 10 is somewhat different from that in the receiver circuit 11*a*, such difference being in the lock range, the PLL arrangement 13 within the receiver circuit 11*a* can follow completely the frequency in the transmitter circuit 10. Such difference in frequency will not cause any distortion in the demoulation outputs. In accordance with the conventional FM system implemented with a combination of coil and capacitor, these differences in frequency result in detector error hence distortion due to synchronization step-out.

The lock detector 17 determines whether the PLL arrangement 13 is in the locked condition and switches the low frequency amplifier 30 to either the operative state or the cut-off state in response to the results of such determinations. That is, in the case that the frequency-modulated carrier signals from the transmitter circuit 10 are applied to the PLL arrangement 13 within the receiver circuit 11*a* via the A.C. power lines 12, the PLL arrangement 13 is in the locked condition to develop the FM demodulator output therefrom. The lock detector 17 senses the locked condition and turns the low frequency amplifier 30 to the operable state. However, in the absence of the frequency-modulated carrier signals, the input signals Vs($t$) to the phase comparator 19 within the lock detector 17 are at zero or little voltage value and accordingly the output signals V$\phi$'($t$) thereof also are at zero or little voltage value. The result is that the output signals Vd'($t$) from the low-pass filter 20 extracting the frequency difference component of the output signals V$\phi$'($t$) fall below the predetermined voltage and the output of the level detector 21 is effective to turn the low frequency amplifier 30 to the cut off state.

In general, a carrier transmission system utilizing commercial A.C. lines as the transmission lines thereof has an inclination to pick up noises of high level. Therefore, in the absence of the frequency-modulated carrier signals, such noises are applied to and amplified by the low frequency amplifier 30 and then derived from the speaker circuit 31. Nevertheless, as noted earlier, since the lock detector 17 is added to the PLL arrangement 13 within the receiver circuit to establish a squelching circuit, the low frequency amplifier 30 is in the cut-off state in response to the absence of the frequency-modulated carrier signals, thereby preventing noises from deriving from the speaker circuit 31.

In the conventional FM system this type of the squelching circuit is arranged to detect the presence and absence of the carrier signals or modulated signals and, however, may be in response to noises. Therefore, difficulties are encountered in arriving at a completely squelching circuit at reduced cost.

In the embodiment of the invention, being capable of locking the frequency within the lock range, the PLL arrangement 13 itself has the functions of tracking filters to reduce noises. In addition, the lock detector 17 added to the PLL arrangement can serve as the squelching circuit in the manner previously described. Viewing the system illustrated in the foregoing embodiment as a whole, influences due to arrival of noises are minimized by a combination of such effects.

Referring again to FIG. 1, the additional receiver circuit 11*b* may be connected to the commercial A.C. power lines 12 by the plug 27 to establish connection between the transmitter circuit 10 and the receiver circuit 11*b* through the commercial power lines 12. The additional receiver circuit 11*b* operates in the similar fashion as the receiver circuit 11*a*. Needless to say, it will be noted that the transmitter circuit 10 may be connected to one or more receiver circuits 11*a*, 11*b*. In this instance the free-running frequencies of the receiver circuits 11*a*, 11*b* should be chosen to equal or approximate that of the common transmitter circuit 10. Moreover, plural-channel transmission such as stereo transmission can be practiced by providing a plurality of transmitter circuits having different free-running frequencies within the lock range together with a plurality of receiver circuits having corresponding free-running frequencies.

As illustrated by the receiver circuit 11*b* of FIG. 1, it is preferrable that an electric circuit 32 of electric apparatus such as a lighting instrument is connected to the plug 27 and the receiver circuit is incorporated into the apparatus.

Figure 3:
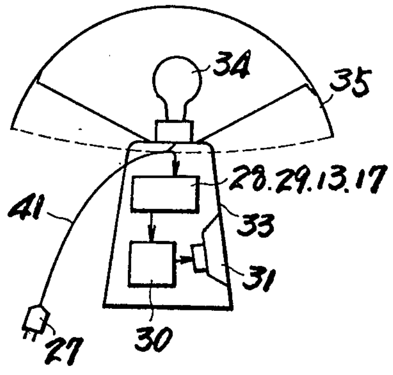
FIG. 3 is a sectional view showing a table lamp containing a receiver circuit of the carrier transmission system therein.

FIG. 3 shows an example of an electric table stand carrying the receiver circuit 11*b* thereon, which comprises a stand 33, an electric lamp 34 and a cover 35. The receiver circuit including the power circuit 28, the matching circuit 29, the PLL arrangement 13, the lock detector 17, the low frequency amplifier 30, the speaker circuit 31, etc., is housed within the stand 33.

Figure 4:
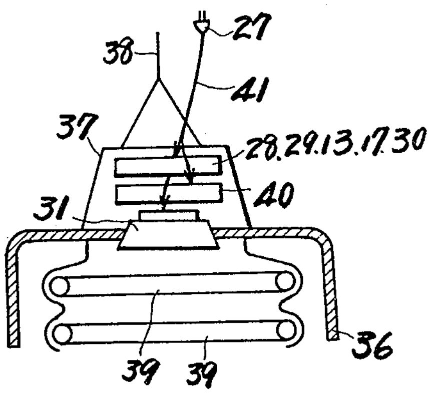
FIG. 4 is a sectional view a lighting instrument containing the receiver circuit.

FIG. 4 shows another example wherein the receiver circuit is housed within a hanging light fixture consisted of a casing 37, a hanging member 38, a circular fluorescent lamp 39, and a driving circuit 40. In particular, the receiver circuit components are all housed within the casing 37 except the speaker positioned about the center of a shade and directled downward. Connection to the commercial power A.C. lines is provided via the plug 27. In the case where receiver circuit is accommodated within an electric instrument in this manner, the plug 27 and A.C. power cord 41 for purpose of utilizing the transmission system may be omitted. The transmission system is suitable for background music instruments.

I claim:

1. A frequency modulated carrier transmission system using commercial power lines comprising:

at least a pair of power lines;

a transmitter including a source of sound signals, a first voltage controlled oscillator means having a predetermined free-running center frequency driven by said source of sound signals to provide a frequency modulated carrier signal representative of said sound signals, amplifying and first matching means driven by said frequency modulated carrier signal for coupling the latter to said power lines; and receiver means including second matching means coupling said receiver means to said power lines to receive said frequency-modulated carrier signal, a phase locked loop circuit including a second voltage controlled oscillator having a substantially identical free-running frequency as said first oscillator and driven by said matching means to provide a demodulated output signal and a lock detection output signal, low frequency amplifier means receiving and amplifying said demodulated output signal in response to the existence of a said lock detection output signal to provide a driver output signal, and sound reproducing means responsive to said driver output signal.

2. The carrier transmission system defined in claim 1, wherein said receiver means and transmitter each include a power plug means connecting said first and second matching means to said power lines.

3. The carrier transmission system defined in claim 2, wherein said receiver means and said transmitter each include a power supply connected across said power plug means energized by said power lines and supplying operating bias to said receiver means and said transmitter.

4. The carrier transmission system defined in claim 2, wherein said receiver means further includes an electric instrument connected across said power plug means for energization by the power lines.

5. The carrier transmission system defined in claim 4, wherein said electric instrument comprises a housing for said receiver means.

6. A frequency-modulated carrier transmission system using commercial power lines comprising:

a pair of power lines;

transmitter means including an information signal source and modulator means responsive to information signals from said source for generating frequency-modulated signals, representative of the information contained in said signals, about a predetermined center carrier frequency and coupling said modulated signals with said power lines; and receiver means coupled with said power lines and including a phase locked loop demodulator receiving and responsive to said modulated signals to provide a demodulated output signal and an output level signal indicative of the strength of the received signals, low frequency amplifier means, responsive to a predetermined minimum value of said output level signal for amplifying said demodulated output and output means driven by said low frequency amplifier means to reproduce said information.

7. The frequency-modulated carrier transmission system of claim 6, wherein said phase-locked loop demodulator includes:

first and second phase comparator circuits each having first and second inputs and an output receiving at their respective first inputs said frequency-modulated signals;

first and second low pass filter means driven, respectively, by said outputs of said first and second phase comparator circuits;

a voltage-controlled oscillator means with substantially the same free-running frequency as said center frequency having an input driven by said first low pass filter means and an output driving said second input of said first phase comparator circuit;

a 90° phase shift circuit having an input driven by said oscillator output and an output driving said second input of said second phase comparator circuit;

said first low-pass filter means providing a demodulated information signal at its output and said second low pass filter means providing a second demodulated information signal at its output; and level detection means responsive to a predetermined minimum signal strength of said second demodulated information signal to generate said output level signal.

* * * * *